3,354,102
FLAME-RESISTANT RESINOUS COMPOSITIONS BASED UPON EPOXY RESINS AND HALO-GENATED POLYACIDS AND PROCESS FOR PREPARATION OF SAME
Jacques Vuillemenot, La Mulatiere, France, assignor to Societe d'Electro-Chimie, d'Electro-Metallurgie et des Acieries Electriques d'Ugine, a corporation of France
No Drawing. Filed Feb. 27, 1963, Ser. No. 261,468
Claims priority, application France, Mar. 2, 1962, 889,778
21 Claims. (Cl. 260—18)

This invention relates to:
(a) Resinous thermosetting compositions formed by the mixture of at least one epoxy resin and a halogenated polyacid derived from biphenyl, which polyacid functions as a curing agent for the resin,
(b) A process for the preparation of these compositions, and
(c) Cured resins obtained from these compositions and characterized by excellent flame-resistant properties.

These compositions contain epoxy groups having the general formula:

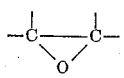

The preferred epoxy resins are those which contain two or more epoxy groups per molecule. They may in particular be formed:

(A) by a glycidic polyether derive from an organic polyhydroxylated compound,
(B) by a non-glycidic compound possessing several epoxy groups per molecule,
(C) by a mixture in various proportions of A and B.

The epoxy resins of A comprise all the reaction products between the polyhydroxylated alcoholic and phenolic compounds such as butanediol, glycerin, resorcin, hydroquinone, diphenylol propane, and an epihalogenohydrin such as epichlorohydrin. Of special interest are the epoxyhalogenated resins obtained according to a process of Robert Thermet and Lucien Gachet, which process is the subject of U.S. patent application Ser. No. 150,127, filed Nov. 6, 1961, now abandoned, relating to "Process of Making Epoxy Resins," by causing a chlorohydrin to react with octochlorodihydroxybiphenyl.

The epoxy resins of B comprise aliphatic products such as the epoxidized polyolefins such as epoxidized polybutadienes some of which are known as "Oxiron" resins (mark registered by Food Machinery and Chemical Corporation for epoxidized polybutadienes), epoxidized derivatives of glycerides of unsaturated fatty acids, such as the epoxidized oils of linseed, soybean, and cyclic products such as the diepoxidized derivatives of dipentene, of vinyl 1 cyclohexene 3.

The halogenated polyacids incorporated in these thermosetting compositions of the invention have the general formula:

(HOOC—R₁—O)ₙR₂ in which R₁ represents a divalent saturated or unsaturated hydrocarbonaceous radical, $n$ represents an integer number which has a value from 2 to 4, and R₂ represents a halogenated radical having the valency $n$ and derived from biphenyl.

The halogenated polyacids may be obtained, according to a corresponding U.S. patent application Ser. No. 256,532, filed on Feb. 6, 1963, of Laszlo Szobel, Maurice Troussier and Jacques Vuillemenot entitled "Polyacids and Polyesters Derived From Halogenated Polyphenyls and Process for Preparation of Same," now abandoned and succeeded by continuation-in-part application Ser. No. 488,812, filed Sept. 20, 1965, by reacting a monohalogeno acid with an alkaline salt of a polyhydroxy-halogenodiphenyl, for example monochloroacetic acid or monobromoacetic acid with octachlorodihydroxydiphenyl (OCDHDP), in the presence of an alkaline agent such as sodium or potassium hydroxides. The polyhydroxy-halogenodiphenyl, the octachlorodihydroxydiphenyl for example, may be prepared by reacting sodium hydroxide with decachlorodiphenyl in the presence of a solvent such as methylic alcohol in an autoclave at 135–150° C. However, I prefer to use the process described in a corresponding U.S. patent application, Ser. No. 172,846, of Ludovic Parvi, filed Feb. 13, 1962, entitled "Process of Preparing and Purifying Octochlorodihydroxydiphenyl" (U.S. Letters Patent No. 3,243,464), which comprises hydrolizing powdered decachlorodiphenyl with an aqueous solution containing from 6 to 10% of sodium hydroxide above 240° C. and preferably between 240 and 250° C. under autogenous pressure. It is preferable to use from 4.2 to 5 mols of sodium hydroxide per mol of decachlorodiphenyl. After reaction the solution of the sodium phenate is filtered, then a soluble bivalent salt of a metal such as iron is added. The precipitated metal hydroxide resulting from this addition is separated and the filtrate is acidified with the mineral acid in order to precipitate OCDHDP. After washing, the pure OCDHDP is then dissolved in an alkaline medium to produce the solution of the alkaline salt which reacts with a halogenated acid to give said halogenated polyacids. The halogenated polyacids have the general formula:

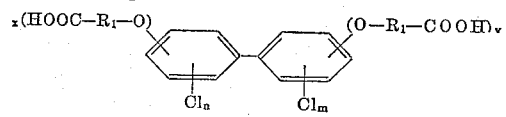

in which R₁ is selected from the group consisting of a divalent saturated and a divalent unsaturated aliphatic hydrocarbon radical, the amount $(x+y)$ is an integer number having a value from 2 to 4, $(m+n)$ is an integer number having a value from 8 to 6 and the amount $(x+y+m+n)$ always has the value 10, said polyacid being present in an amount corresponding to from 0.6 to 1.2 carboxy equivalent per epoxy equivalent. These polyacids are solid products and soluble in the majority of conventional solvents.

The amount of halogenated polyacid to be reacted depends on the nature of the epoxy resin and the desired properties of the final product. In general, the quantity varies between 0.6 and 1.2 preferably being 1, carboxy equivalent per epoxy equivalent. The term equivalent represents the quantity of material evaluated in grams containing either a carboxy group or an epoxy group.

One advantage of the present invention is the ease with which the mixtures of halogenated polyacids and epoxy resins may be prepared. It suffices to add the first progressively to the resin under agitation and brought to a temperature lying between 40° C. and 120° C., preferably between 60° C. and 100° C., if it is liquid, or at a temperature slightly exceeding its softening temperature if it is solid. It may equally be incorporated in the form of a solution in a solvent.

The mixtures of the invention are characterized by satisfactory pot-life, comparable to those of the conventional systems of organic polycarboxylic acid or polycarboxylic acid anhydride combined with epoxy resin. It is equally possible to obtain compositions of longer pot-life by preparing the mixture of the powdered halogenated polyacid and powdered solid resin in the cold state.

My invention also includes the halogenated polyacids in admixture with one or more organic polycarboxylic acids or polycarboxylic acid anhydrides, such as the oxalic, succinic, citric, tartaric, adipic, sebacic acids, and the maleic, phthalic, succinic, dodecylsuccinic anhydrides. The amounts of these admixtures of hardeners are between 0.6 and 1.2, preferably 1, active group of the admixture of hardeners corresponding to an epoxy group. The term active group describes either an anhydride group in the case of an anhydride, or a carboxy group in the case of an acid.

To these compositions hereinabove described can be added inert fillers, pigments, plastifiers, reactive or non-reactive diluents, or mixtures of these different compounds.

The flame resistant modified or unmodified thermosetting resinous compositions may be employed to prepare masses for castings or laminations, paints, varnishes, in the production of objects intended for the electrical and/or electronic industries, in the sheathing of electrical and/or electronic components, etc.

The hardening or curing conditions of said compositions essentially depend on the nature of the resin and of the curing agents. In general, the most satisfactory conditions are achieved for curing periods of from 24 to 48 hours and temperatures lying between 80° C. and 200° C., preferably between 100° C. and 160° C. The resins cured under these conditions possess excellent flame resistant properties and exhibit interesting mechanical and thermal properties, as demonstrated by the following non-limiting examples performed with (octochlorobiphenylenedioxy) diacetic acid.

In these examples, the parts represent weights. The results listed were obtained by the test methods standardized in the United States of America, namely:

for impact strength (notched Izod specimen) under ASTM D256–56
for Rockwell hardness under ASTM D785–51
for heat deformation temperature under 264 p.s.i. under ASTM D648–56
for $1/10$ Vicat point (temperature at which the penetration of a needle of 1 mm.$^2$ section under a load of 1 kg. amounts to 0.1 mm.) under ASTM D1 525–58T
for inflammability under ASTM D635–56T and ASTM D757–49.

*Example 1*

A mixture of 200 parts of (octochlorobiphenylenedioxy) diacetic acid and 100 parts of the condensation product of butanediol and epichlorohydrin such as Araldite resin $RD_2$ (mark registered by the CIBA Company for a condensation product between butanediol and epichlorohydrin) was prepared at 100° C. under vacuum, and hardened for 48 hours at 140° C.

The product obtained was transparent, yellow, hard and self-extinguishing according to the ASTM D635–56T test.

*Example 2*

A mixture of 170 parts of (octochlorobiphenylenedioxy) diacetic acid and 100 parts of the condensation product of Example 1 was prepared at 100° C. and under vacuum, to which was added 11 parts of maleic anhydride at atmospheric pressure. The whole was hardened for 48 hours at 140° C.

The product obtained was transparent and yellow. Its properties are as follows:

| Properties | Units | Results |
|---|---|---|
| Specific weight | G./cm.$^3$ | 1.50 |
| Impact strength | Lb.-ft./inch | 0.30 |
| Rockwell hardness | Scale R | 95.5 |
| Heat deformation temperature | ° C | 40 |
| $1/10$ Vicat point | ° C | 37 |
| Inflammability: | | |
| ASTM D635–56T | Inch/min | (¹) |
| ASTM D757–49 | do | (²) |

¹ Self-extinguishing.
² Burns only when in contact with the glowing filament.

By way of comparison, an analogous mixture was prepared, but in which the (octochlorobiphenylenedioxy) diacetic acid was replaced by a chemically equivalent quantity of maleic anhydride.

This mixture had the following composition:

| | Parts |
|---|---|
| The condensation product of Example 1 | 100 |
| Maleic anhydride | 70 |

It was hardened for 48 hours at 140° C.

The product obtained was transparent, deep yellow and had the following properties:

| Properties | Units | Results |
|---|---|---|
| Specific weight | G./cm.$^3$ | 1.295 |
| Impact strength | Lb.-ft./inch | (¹) |
| Rockwell hardness | Scale R | 28 |
| Heat deformation temperature | ° C | 43 |
| $1/10$ Vicat point | ° C | 25.5 |
| Inflammability: ASTM D635–56T | Inch/min | 0.75 |

¹ Measurement not possible—too fragile.

*Example 3*

A mixture of 150 parts of (octochlorobiphenylenedioxy) diacetic acid and 100 parts of the condensation product of glycerin and epichlorohydrin such as "Epikote" 812 resin (mark registered by the Shell Company for a condensation product between glycerin and epichlorohydrin) was prepared at 100° C. and under vacuum, and 12 parts of maleic anhydride were added thereto at normal pressure. The whole was hardened for 48 hours at 140° C.

The product obtained was transparent, yellow and had the following properties:

| Properties | Units | Results |
|---|---|---|
| Specific weight | G./cm.$^3$ | 1.54 |
| Impact strength | Lb.-ft./inch | 0.69 |
| Rockwell hardness | Scale M | 80.5 |
| Heat deformation temperature | ° C | 51 |
| $1/10$ Vicat point | ° C | 50 |
| Inflammability: | | |
| ASTM D635–56T | Inch/min | (¹) |
| ASTM D757–49 | do | (²) |

¹ Self-extinguishing.
² Burns only in contact with the glowing filament.

By way of comparison, a mixture was prepared of 100 parts of the condensation product of Example 3 and 65 parts of maleic anhydride, at 100° C., and hardened for 48 hours at 140° C.

This product was transparent and yellow and had the following properties:

| Properties | Units | Results |
|---|---|---|
| Specific weight | G./cm.$^3$ | 1.39 |
| Impact strength | Lb.-ft./inch | 0.87 |
| Rockwell hardness | Scale M | 92.5 |
| Heat deformation temperature | ° C | 72 |
| $1/10$ Vicat point | ° C | 61 |
| Inflammability: ASTM D635–56T | Inch/min | 0.61 |

I claim:
1. A flame resistant resinous thermosetting composition comprising a mixture of at least one epoxy resin containing at least 2 epoxy groups per molecule and selected from the group consisting of glycidic polyethers resulting from the reaction between hydroxylated alcoholic and phenolic compounds and an epihalogenohydrine and of non-glycidic compounds selected from the group consisting of epoxidized polyolefins, epoxidized derivatives of glycerides of unsaturated fatty acids and di-epoxidized derivatives of dipentene and of vinyl 1 cyclohexene 3, and a halogenated polyacid having the general formula:

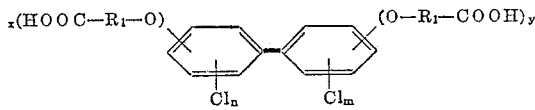

in which $R_1$ is selected from the group consisting of a divalent saturated and a divalent unsaturated aliphatic hydrocarbon radical, the amount $(x+y)$ is an integer number having a value from 2 to 4, $(m+n)$ is an integer number having a value from 8 to 6 and the amount $(x+y+m+n)$ always has the value 10, said polyacid being present in an amount corresponding to from 0.6 to 1.2 carboxy equivalent per epoxy equivalent.

2. The composition of claim 1 characterized by said polyacid being present in an amount corresponding to one carboxy equivalent per epoxy equivalent.

3. The composition of claim 1 characterized by said polyhydroxylated alcoholic and phenolic compounds being selected from the group consisting of butanediol, glycerin, resorcin, hydroquinone, diphenylol propane, octochlorodihydroxybiphenyl.

4. The composition of claim 1 characterized by said resin being selected from the group consisting of the reaction products of polyhydroxylated alcoholic and phenolic compounds with an epihalogenohydrin, epoxidized polyolefins, epoxidized derivatives of glycerides of unsaturated fatty acids and diepoxidized derivatives of dipentene and of vinyl 1 cyclo-hexene 3.

5. The composition of claim 4 characterized by said polyhydroxylated alcoholic and phenolic compounds being selected from the group consisting of butanediol, glycerin, resorcin, hydroquinone, diphenylol propane, octochlorodihydroxybiphenyl.

6. The composition of claim 1 characterized by said composition having been heated to a temperature between 80° C. and 200° C. for curing same.

7. The composition of claim 6 characterized by said temperature being between 100° C. and 160° C.

8. The composition of claim 1 characterized by said composition including at least one of an inert filling substance, a pigment, a plastifier, reactive and non-reactive diluents and mixtures thereof.

9. The composition of claim 1 wherein a member selected from the group consisting of a polycarboxylic acid and a polycarboxylic acid anhydride and said halogenated polyacid comprise a curing agent which is present in an amount corresponding to 0.6–1.2 active group per epoxy group.

10. The composition of claim 9 characterized by said curing agent having one active group per epoxy group.

11. The composition of claim 9 characterized by said polycarboxylic acid and polycarboxylic acid anhydride being selected from the group consisting of oxalic, succinic, citric, tartaric, adipic, sebacic acids and maleic, phthalic, succinic, dodecylsuccinic anhydrides.

12. The composition of claim 9 characterized by said composition having been heated to a temperature between 80° C. and 200° C. for curing same.

13. The composition of claim 12 characterized by said temperature being between 100° C. and 160° C.

14. A process for preparation of the composition of claim 1 comprising producing said mixture by adding said polyacid progressively to said resin while agitating said resin and with said resin heated to a temperature between 40° C. and 120° C.

15. The process of claim 14 characterized by said resin being heated to a temperature between 60° C. and 100° C.

16. The process of claim 14 characterized by curing said composition by heating same to a temperature between 80° C. and 200° C.

17. A process for preparation of the composition of claim 1 comprising producing said mixture of said resin being in a solid state and said polyacid by adding said polyacid progressively to said resin while agitating same and with said resin heated to a temperature slightly above its softening temperature.

18. A process for preparation of the composition of claim 1 comprising producing said mixture of said resin in a powdered solid state and at ambient temperature and of said curing agent in a powdered state.

19. A process for the preparation of the composition of claim 1 comprising producing a mixture of said resin and of said polyacid dissolved in a solvent therefor to form a solution thereof.

20. A process for preparation of the composition of claim 9 comprising producing said mixture of said resin and said curing agent by adding said curing agent progressively to said resin while agitating and heating said resin to a temperature between 40° C. and 120° C.

21. The process of claim 20 characterized by curing said composition by heating same to a tempearture between 80° C. and 200° C.

References Cited

UNITED STATES PATENTS

| | | | |
|---|---|---|---|
| 2,603,619 | 7/1952 | Dazzi | 260—473 |
| 2,935,488 | 5/1960 | Phillips et al. | 260—47 |
| 3,243,464 | 3/1966 | Parvi et al. | 260—620 |

FOREIGN PATENTS

| | | |
|---|---|---|
| 711,592 | 7/1954 | Great Britain. |
| 1,091,326 | 10/1960 | Germany. |

DONALD E. CZAJA, *Primary Examiner.*

LEON J. BERCOVITZ, *Examiner.*

R. W. GRIFFIN, *Assistant Examiner.*